(12) United States Patent
Navarria et al.

(10) Patent No.: US 12,528,648 B1
(45) Date of Patent: Jan. 20, 2026

(54) SYSTEMS AND METHODS FOR PAYLOAD SHUTTLES FOR EFFICIENTLY LOADING AND UNLOADING CONTAINERS

(71) Applicant: Amazon Technologies, Inc., Seattle, WA (US)

(72) Inventors: Filippo Navarria, Milan (IT); Kunal Chheda, New York, NY (US); Domenico De Giglio, Bari (IT)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 18/182,977

(22) Filed: Mar. 13, 2023

(51) Int. Cl.
*B65G 1/06* (2006.01)

(52) U.S. Cl.
CPC .................... *B65G 1/065* (2013.01)

(58) Field of Classification Search
CPC .. B65G 1/0261; B65G 1/0485; B65G 1/0492; B65G 1/06; B65G 1/065; B65G 1/10
See application file for complete search history.

(56) References Cited

U.S. PATENT DOCUMENTS

| | | | | |
|---|---|---|---|---|
| 4,492,504 A * | 1/1985 | Hainsworth | ............. | B66F 9/07 414/280 |
| 8,790,061 B2 * | 7/2014 | Yamashita | ........... | B65G 1/0435 414/280 |
| 9,522,781 B2 * | 12/2016 | Hortig | .................... | B65G 1/065 |
| 9,718,617 B2 * | 8/2017 | Koide | .................. | B65G 1/0492 |
| 11,208,264 B2 * | 12/2021 | Moulin | ................ | B65G 1/0435 |
| 11,602,775 B1 * | 3/2023 | Navarria | .................... | B07C 5/36 |
| 11,897,694 B2 * | 2/2024 | Salichs | ................ | B65G 1/0492 |
| 12,371,278 B2 * | 7/2025 | Du | ........................ | B66C 23/208 |
| 2006/0245862 A1 * | 11/2006 | Hansl | ................... | B65G 1/0435 414/281 |
| 2008/0131241 A1 * | 6/2008 | King | ...................... | G11B 15/68 414/274 |
| 2021/0047112 A1 * | 2/2021 | Stevens | .................... | B65G 1/04 |

* cited by examiner

*Primary Examiner* — Joseph C Rodriguez
(74) *Attorney, Agent, or Firm* — Eversheds Sutherland (US) LLP

(57) ABSTRACT

Systems, methods, and computer-readable media are disclosed for multi-level storage systems to facilitate movement of shuttles across a multi-level storage structure for retrieving, loading, unloading, and moving packages. The multi-level storage system may include the multi-level storage structure for storing packages, which may be placed into containers and positioned on a container tray. Shuttles may navigate the multi-level storage system to load and unload containers. Each shuttle may hold one or more container and may include one or more actuator systems to load and unload the containers. The actuator systems may include a motor connected to a tether fixed to one or more protrusions which may enter a channel under a container tray to move the container tray onto the shuttle or may unload the container off the shuttle.

20 Claims, 9 Drawing Sheets

SYSTEMS AND METHODS FOR PAYLOAD SHUTTLES FOR EFFICIENTLY LOADING AND UNLOADING CONTAINERS

BACKGROUND

With the popularity of e-commerce and delivery services, the volume of packages delivered continues to increase. The high volume of packages requires delivery fulfillment centers and/or sorting centers capable of receiving, sorting, and distributing a large volume of packages. For example, a fulfillment and/or sorting center may fulfill millions of orders a year. As a result, fulfillment and/or sorting centers will receive, package, and distribute millions of items for delivery. Packages may be sorted and stored on various levels of a multi-level storage structure for compact and efficient package storing. While it is desirable to store packages in a high density and compact arrangement that may extend several levels high, retrieval vehicles and/or individuals must be able to easily access the stored packages for sorting and delivery. While compact storage is desirable from an efficiency and economics perspective, compact storage makes package retrieval, loading and unloading challenging. Accordingly, there is a need for a fast, reliable, and cost effective container retrieval system in a high density sorting structure that provides efficient access to the stored containers.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

A multi-level storage system including shuttles for loading and unloading containers and/or packages onto and from multi-level storage structures are provided herein. The multi-level storage systems may be positioned within or otherwise may be integrated with fulfillment centers that may be designed to receive, induct, sort, and/or distribute a large volume of packages (e.g., products, packaged products, items, etc.). For example, the multi-level storage system may be used at or incorporated into a fulfillment center having several hundred thousand, a million, or more square feet and may receive and distribute millions of packages per year. The term fulfillment center used herein is understood to include any fulfillment, sorting, and/or transportation center.

The multi-level storage system may be a container support structure that may include one or more shuttles designed to traverse a multi-level storage structure that may support containers and/or packages. For example, containers may be support structures that incorporate a container tray or otherwise are received by a container tray. Containers may receive one or more packages. The shuttles may be designed to move to different levels of the multi-level storage structure and may move along each level via a rail or other guide system.

Shuttles may include wheels or other suitable structures for moving along the rails and may further include power transmission receivers, such as brush arms for contacting the electrified rail for receiving power from the multi-level storage structure. Alternatively, shuttles may have batteries or any other suitable power source. Shuttles may further include actuator systems for loading and unloading packages. Actuator systems may be designed to interface with a container tray to cause the container tray to be loaded onto the shuttle and may further unload the container tray off the shuttle.

The actuator system may include a motor, a drive shaft and a tether connected to the drive shaft via a gear system. As the motor turns the drive shaft, the tether may be caused to move. Protrusions such as pins or rods may be fixed to the tether and may move with the tether. Container trays may include channels on an underside of the container trays that may receive the protrusion. The protrusions may engage catches in the channels. Using the actuator system, the shuttle may load a container tray and/or a container onto the shuttle to be moved to another location in the multi-level storage structure or fulfillment centers. For example, the packages on the container tray may be transported to a packaging area, a delivery area, a sorting area, and/or any other area.

Figure 1:
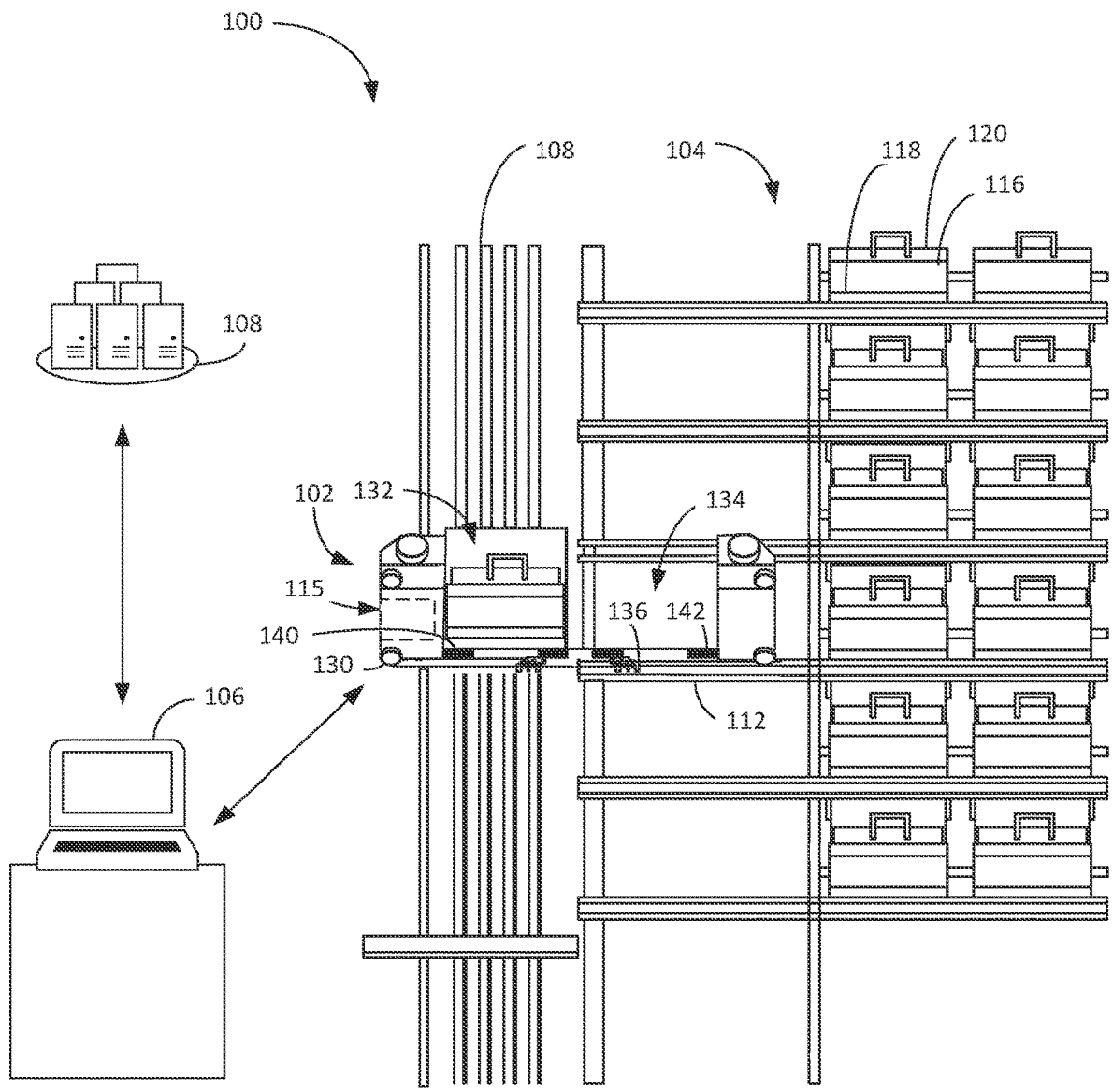
FIG. 1 is a schematic illustration of an example use case a multi-level storage system, in accordance with one or more exemplary embodiments of the disclosure.

Referring now to FIG. 1, an example use case of a multi-level storage system is depicted in accordance with one or more exemplary embodiments of the disclosure. Multi-level storage system 100 may be in a fulfillment center and/or and be designed to efficiently move and deliver containers and for storage and/or retrieval of packages. Multi-level storage system 100 may include additional or fewer components than those illustrated in FIG. 1, such as multiple shuttles, multiple controllers and/or servers, and/or multiple multi-level storage structures.

As shown in FIG. 1, multi-level storage system 100 may include server 108, controller 106, multi-level storage structure 104, and/or shuttle 102. Multi-level storage structure 104, also referred to as a container support structure, may include lift 108, which may lift packages to different levels of the multi-level storage system. Controller 104 and/or server 108 may communicate via wired or wireless communication and/or may communication with multi-level storage system 106, multi-level storage structure 104 and/or shuttle 102 via any well-known wired or wireless system via any well-known wired or wireless system (e.g., Bluetooth, Bluetooth Low Energy (BLE), near field communication protocol, Wi-Fi, cellular network, etc.).

Controller 104 may include one or more processors and/or a display. In one example, controller may be a laptop, desktop, tablet, smart-phone or any other electronic or computing device having memory and a processor. Controller 106 may facilitate communication to, from, and/or between components of multi-level storage structure 104 and/or shuttle 102 (e.g., may control drive shafts, motors, power systems, etc.) via any well-known wired or wireless system via any well-known wired or wireless system (e.g., Bluetooth, Bluetooth Low Energy (BLE), near field communication protocol, Wi-Fi, cellular network, etc.). Controller 106 may process information and/or perform operations and tasks described herein alone or together with server 108.

Server 108 may be one or more servers, computers, desktop computers, laptop computers, datastores, and/or any other electronic or computing device. Server 108 may communicate with controller 106, multi-level storage structure 104, shuttle 106, and/or any other computing devices, via any well-known wired or wireless system via any well-known wired or wireless system (e.g., Bluetooth, Bluetooth Low Energy (BLE), near field communication protocol, Wi-Fi, cellular network, etc.). Server 108 may oversee operation of the fulfillment center and controller 106 and/or server 108, together or alone, and may oversee function and operation of shuttle 102 and multi-level storage structure 104.

Multi-level storage structure 100 may include several levels for storing and supporting containers and/or packages. As shown in FIG. 1, each level may support containers 116 which may be container structures in which one or more packages 120 may be placed or otherwise positioned. For example, container 116 may be any rigid or non-rigid structure (e.g., a tote) for holding a package. Container 116 may incorporate or otherwise may be received by container tray 118. Contain tray 118 may be a rigid structure and may include one or more channels (e.g., recessed regions or protruded region) on an underside.

Each level of multi-level storage structure 104 may support multiple containers 116 and may further include rail 112 which may be any type of guide structure for guiding shuttle 102 to various locations along each respective level of multi-level storage structure 104. Rail 112 may be electrified and may make an electrical connection with shuttle 102 to power shuttle 102. Multi-level storage structure 104 may include lift 108, which may lift shuttles up and lower shuttles down multi-level storage structure 104 so that shuttles 104 may access each level of multi-level storage structure 104.

Shuttle 102 may load one or more container trays 118, containers 116, and/or packages 120 onto shuttle 102. Shuttle 102 may include motor 115, container receiving area 132 and/or container receiving area 134. Shuttle 102 may include wheels 130 to interface with rail 112 and guide shuttle 102 along rail 112. Shuttle 102 may further include power transmission receivers (e.g., power transmission arms 136). Power transmission arms 136 may be brush arms designed to interface with an electrified portion of rail 112 and provide continuous electrical energy to shuttle 102 to power shuttle 102.

Shuttle 102 may also include actuator systems 140 in container receiving area 132 and actuator system 142 in container receiving area 134. Motor 115 may power wheels 130 and/or may power actuator systems 140 and/or 142. Alternatively, motor 115 may power wheels 130 and a different motor may power actuator system 140 and/or 142. Actuator systems 140 and 142 may include one or more protrusions designed to interface with a container tray (e.g., container tray 118) to cause a container tray, and thus container 116 and any packages therein to load onto shuttle 102 at container receiving area 132 and/or container receiving area 134. Actuator systems 140 and 142 may also be used to unload a container tray, and thus a container and any packages therein off of the shuttle.

In one example, server 108 and/or controller 106 may cause shuttle 102 to retrieve container 116 and move container 116 to another location in the fulfillment center (e.g., a delivery or shipping area). Alternatively, in another example, shuttle 102 may be sent to another area (e.g., induction area) to receive a container of packages in container receiving area 132, then may be sent to multi-level storage structure 104 to receive a second container in container receiving area 134. Shuttle 102 may optionally deposit the container in container receiving area 132 in the now empty location in multi-level storage structure 104.

Figure 2:
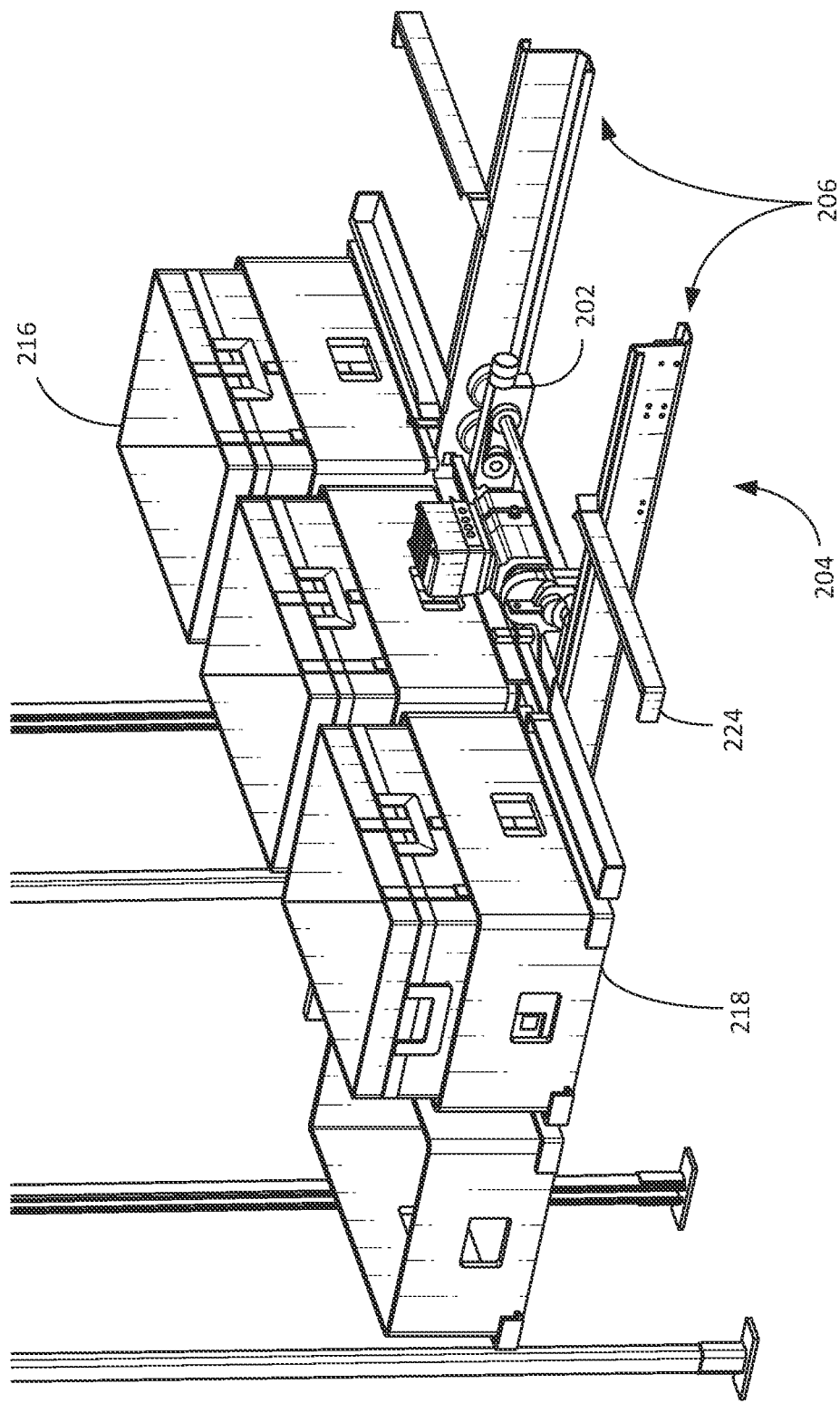
FIG. 2 is a perspective illustration of an example use case of a multi-level storage structure and a shuttle, in accordance with one or more exemplary embodiments of the disclosure.

Referring now to FIG. 2, a perspective view of a shuttle traversing a level of a multi-level storage structure is illustrated. Specifically, shuttle 202 is illustrated riding along rails 206 of multi-level storage structure 204. Shuttle 202 may be the same as or similar to shuttle 102 of FIG. 1. Multi-level storage structure 204 may be the same as or similar to multi-level storage structure 104 of FIG. 1.

As shown in FIG. 2, shuttle may include a set of wheels (e.g., two or more, four or more, six or more, etc.) and may be supported on one side by a first side of multi-level storage structure 204 and on the other side by another side of multi-level storage structure 204 such that shuttle 202 moves along guides 206 down the center of multi-level storage structure 204. It is understood that both or one of rails 206 may have an electrified portion. Each level of multi-level storage structure may include container receiving areas 224.

Container receiving area 224 may be a guide structure designed to support container tray 218 and may be open on one end to receive container tray 218 from shuttle 202 and may be at least partially closed on the other end to prevent container shuttle 218 from moving off of multi-level storage structure 204. Container tray 218 may be rectangular in shape and may receive container 216, which similarly may be rectangular in shape. Alternatively, container tray 218 may receive packages (e.g., boxes, padded envelopes etc.), bags, products, or anything else that can fit into container tray 218.

Referring now to FIGS. 3A-3D, schematic illustrations of a top shown view of a shuttle and a wire representation of a container tray is illustrated. Specifically, shuttle 302 is illustrated engaging container tray 318. Shuttle 302 may be the same as or similar to shuttle 102 of FIG. 1. Container tray 318 may be the same as or similar to container tray 118. While shuttle 302 illustrates two actuator systems and container tray 318 illustrates two channels, it is understood that shuttle 302 may only have one actuator system and container tray 318 may only have one channel.

Figure 3A:
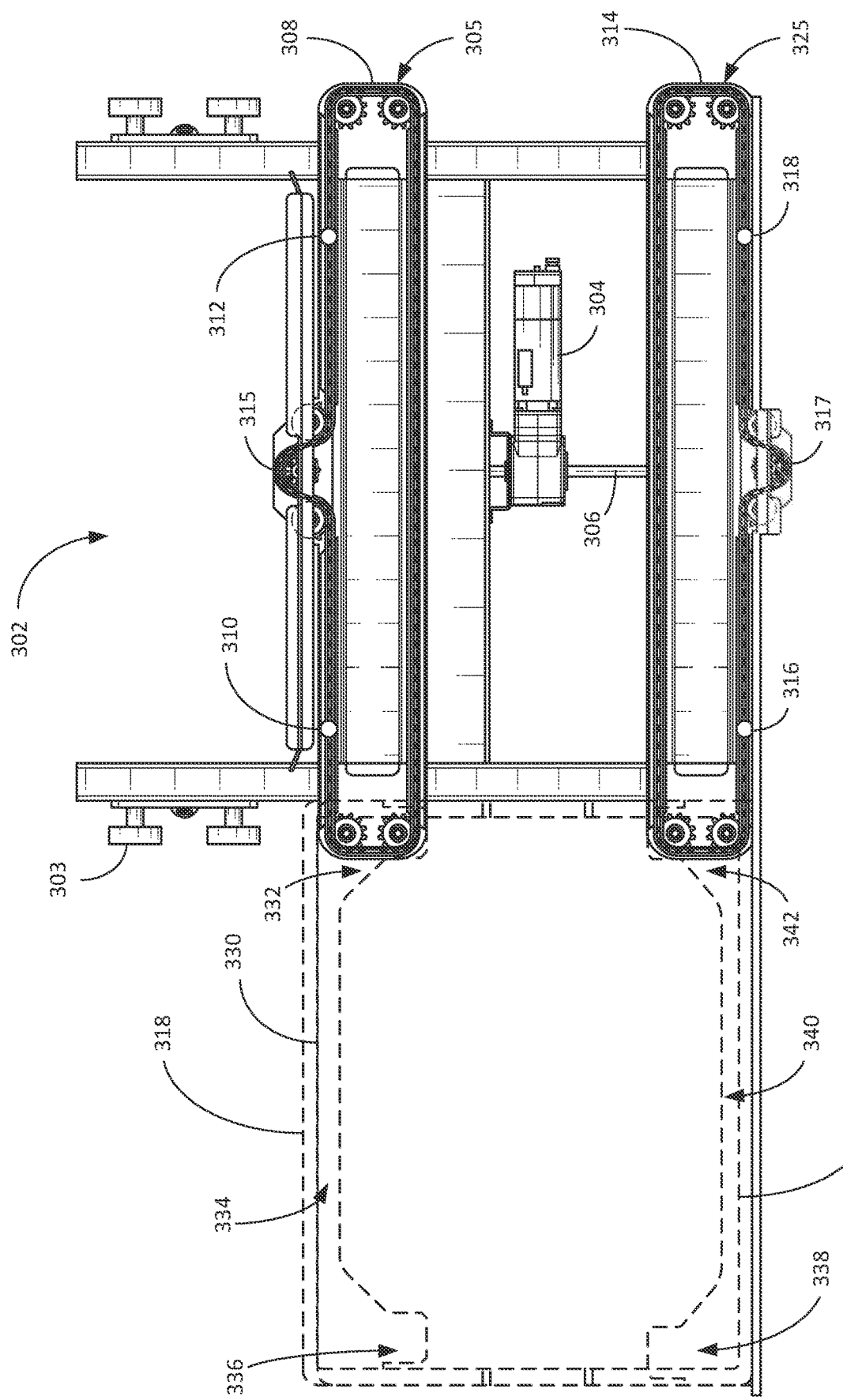
FIGS. 3A-3D are schematic illustrations of an actuator system of a shuttle and a container tray, in accordance with one or more exemplary embodiments of the disclosure.

As shown in FIG. 3A, shuttle 302 may include actuator system 305 and actuator system 325 as well as motor 304. Motor 304 may be any suitable electrical motor and may receive electrical power from the power transmission receiver (e.g., power transmission arms 136 of FIG. 1). Motor 304 may power wheels and/or may provide power to actuator system 305 and/or actuator system 325. Motor 304 may be connected to actuator system 305 and/or actuator system 325 via drive shaft 306. Motor 304 may cause drive shaft 306 to rotate.

Drive shaft 306 may translate rotational motion of drive shaft 306 to gear 315 and/or gear 317. As drive shaft rotates, so too will gears 315 and 317. Actuator system 305 may include tether 308, which may be a continuous loop of a cable, string, chain, tether, or another suitable structure. Actuator system 305 may further include gear 315, which may mechanically interface with tether 308 to cause tether 308 to move (e.g., to rotate either clockwise or counter-clockwise).

Actuator system 305 may further include protrusion 310 and/or protrusion 312, which may be spaced a certain distance apart along and fixed to tether 308. Protrusions 310 and/or 312 may be pins, rods, knobs, or any other suitable protrusion-like structure. It is understood that tether 308 may move along additional gears and/or rollers. Actuator system 325 may be similar to actuator system 305 and may include tether 314, similar to tether 308, which may interface with gear 317 to cause tether 314 to move either clockwise or counter-clockwise.

Container tray 318 may be the same as or similar to container tray 118 of FIG. 1. Container tray 318 may include channel 330 and channel 344, which each may be positioned on an underside or backside of container tray 318. Specifically, container tray 318 may include a top surface for receiving a container, a bottom surface having channels and a body surface between the top surface and the bottom surface include an opening for each channel.

Channel 330 may include a catch 332, which may be adjacent to an opening, catch 336, and guide portion 330 which may extend between and connect catch 332 and 336. Catch 332 and catch 336 may each include a rectangular portion for engaging protrusion 310 and/or protrusion 312. Channel 330 may be separated from channel 340. For example channel 330 may extend near one edge of container tray 318 and channel 340 may near another edge of container 318. Channel 340 may include catch 342, which may be adjacent to an opening, catch 338, and guide portion 344, which may extend between and connect catch 342 and catch 338. Catch 342 and 338 may each include a rectangular shaped portion for engaging protrusion 316 and/or protrusion 318, which may be fixed to tether 314. It is understood that channel 330 and/or 340 may be a recessed structure or a protruded guide.

Figure 3B:
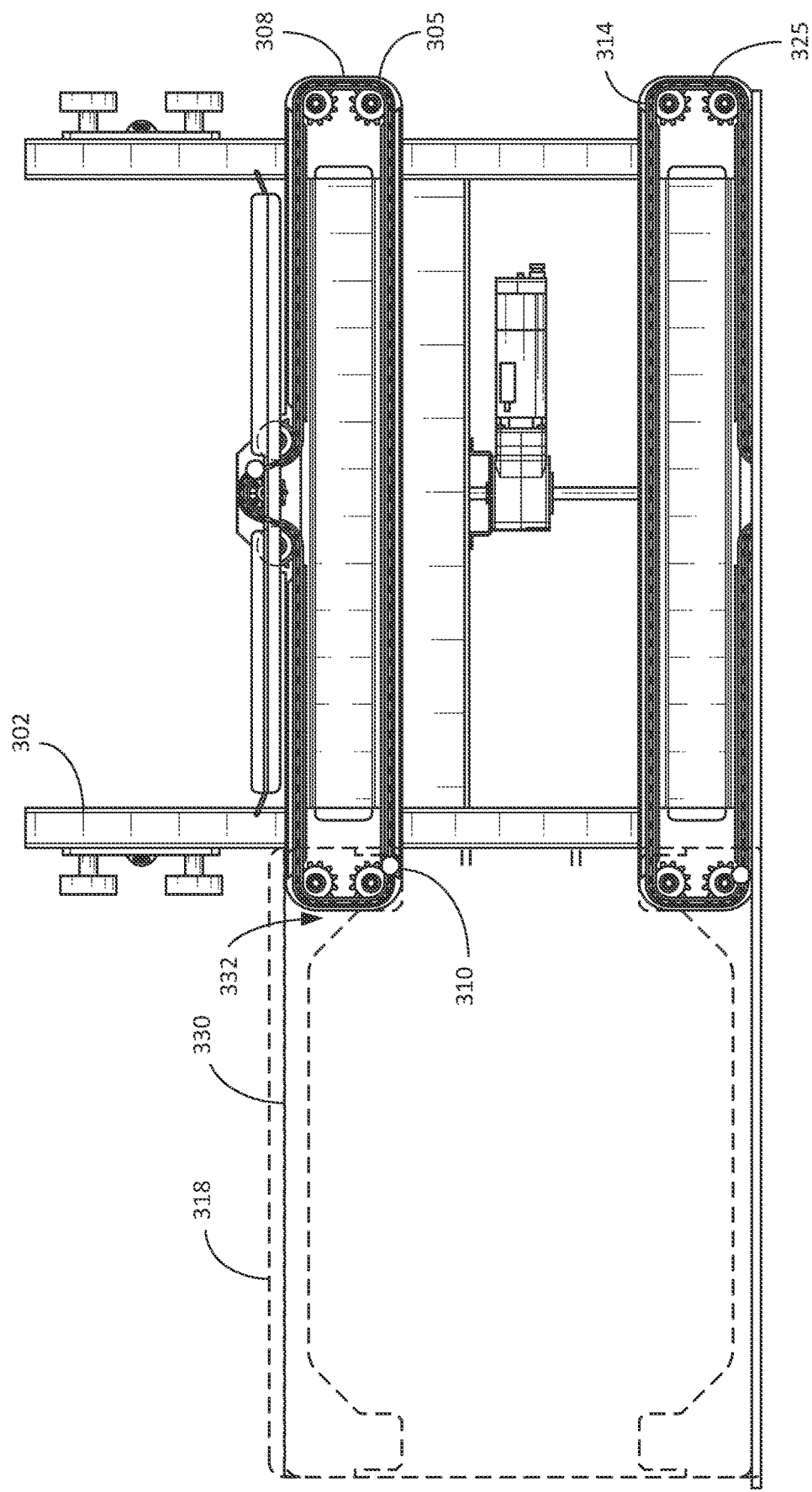

Referring now to FIG. 3B, protrusion 310 of actuator system 305 may be positioned into the opening of channel 330 of container tray 318 and ultimately into catch 332. For example, tether 308 may be rotated counter-clockwise to cause protrusion 310 to enter the opening, to enter catch 332, and engage catch 332. It is understood that actuator systems 305 and 325 may have a height that is below the bottom surface of container tray 318, but protrusions 310 may have a height that is above the bottom surface of container tray 318, but may be sized to fit within the openings of container tray 318 and into the respective channels.

As shown in FIG. 3B, once protrusion enters channel 330, shuttle 302 may no longer traverse the rail without interfacing with container tray 318. Accordingly, shuttle 302 may traverse rail without interfacing container tray 318 with protrusion 310 in one position, and may interface with container tray 318 with protrusion 310 in a second position. It is understood that tether 314 of actuator system 325 may similarly rotate as tether 308 rotates, such that protrusions of actuator system 325 may move in sync with protrusions of actuator system 305.

Figure 3C:
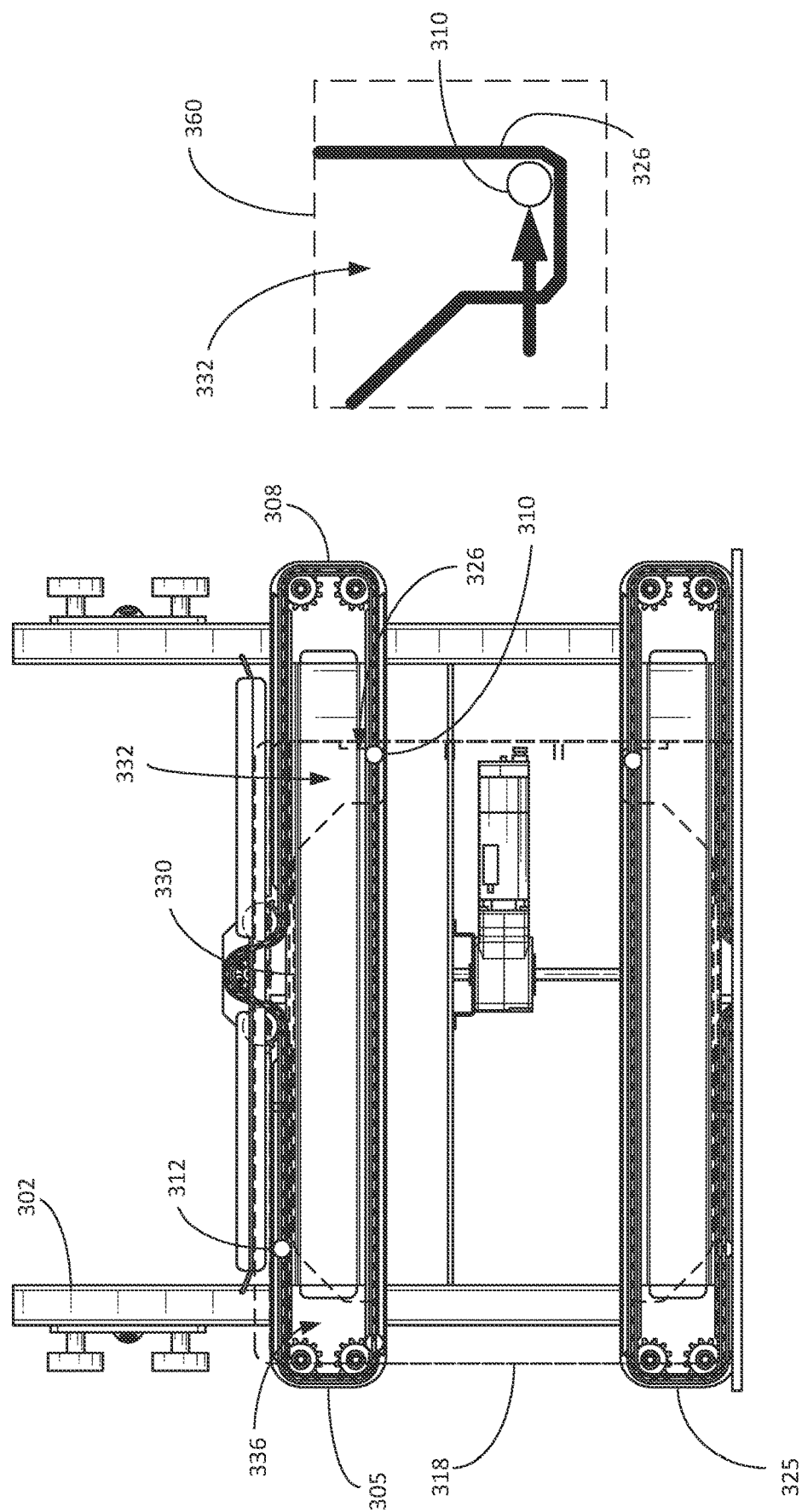

Referring now to FIG. 3C, protrusion 310 of actuator system 305 is engaged with catch 332 and specifically is in contact with wall 326 of catch 332 such that as tether 308 of actuator system 305 and thus protrusion 310 is rotated counter-clockwise, container tray is caused to move together with protrusion 310. As shown in view 332, protrusion is pushed against wall 326 of catch 332 of container tray 318, causing container tray 318 to move towards shuttle 302 As a result, container tray 318 may move towards shuttle 302 and may be loaded onto shuttle 302. As protrusion 310 is moved together with tether 308, so too may protrusion 312 move with tether 308. Protrusion 312 may enter the opening of container tray 318, may traverse guide portion 330 and may ultimately enter catch 336. It is understood that actuator system 325 and the tether and protrusions of actuator system 325 may follow a similar path as those in actuator system 305.

Figure 3D:
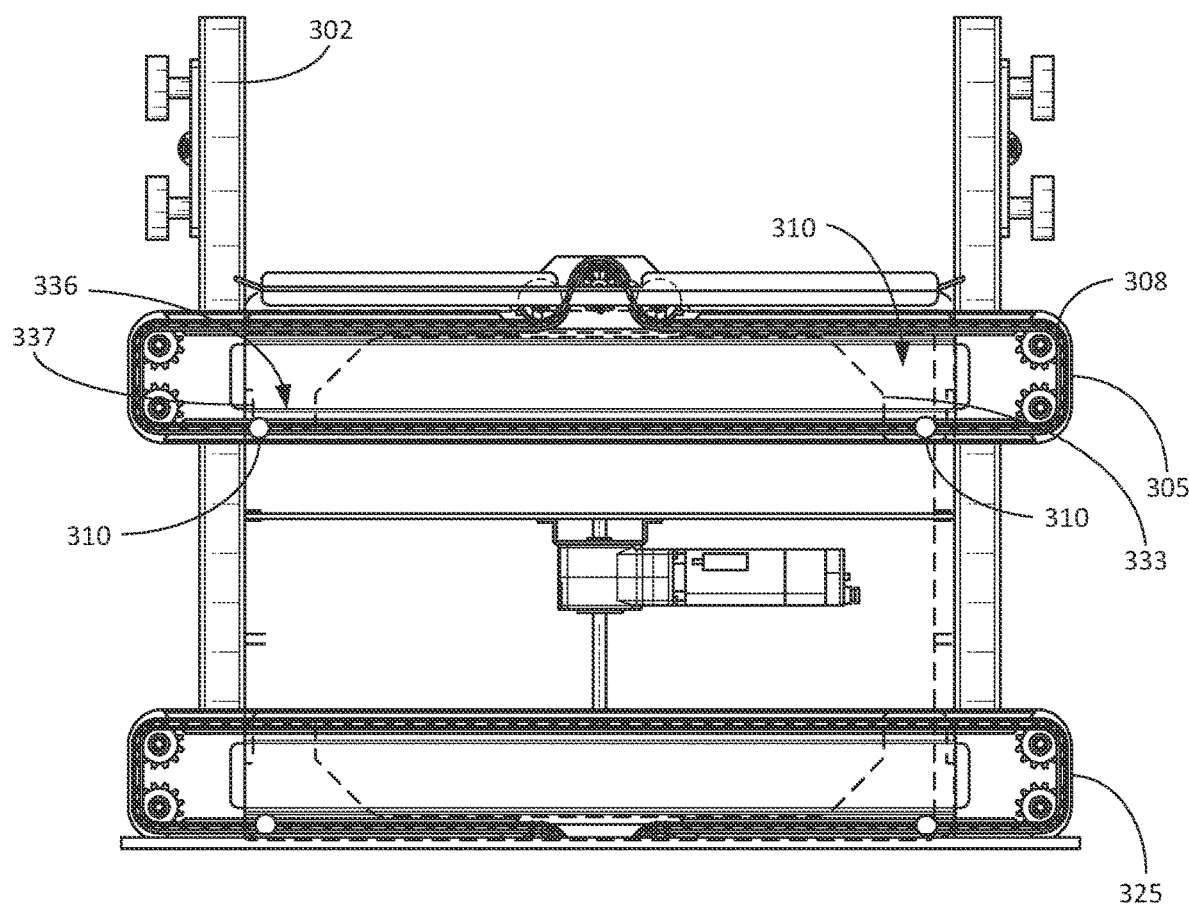

Referring now to FIG. 3D, protrusion 312 may be positioned in catch 336. For example, protrusion 312 may be positioned against wall 337 of catch 336. To unload container tray 318 off shuttle 302, tether 308 of actuator system 305 may be rotated clockwise, causing protrusion 312 to press against wall 337 of container tray 318 to move container tray 318 off of shuttle 302.

Actuator system 325 may similarly move clockwise to push container tray 318 off of shuttle 302. Alternatively, tether 308 may be rotated clockwise to move protrusion 310 against wall 333 of catch 332 to cause container tray 318 to move off shuttle 302. It is understood that container tray 318 may be unloaded to the left of shuttle 302 by moving tether 308 clockwise or alternatively may be unloaded to the right of shuttle 302 by moving tether 308 counter-clockwise. In one example, shuttle 102 may include only one of actuator system 305 and/or actuator system 325, which may only include one protrusion.

Figure 4:
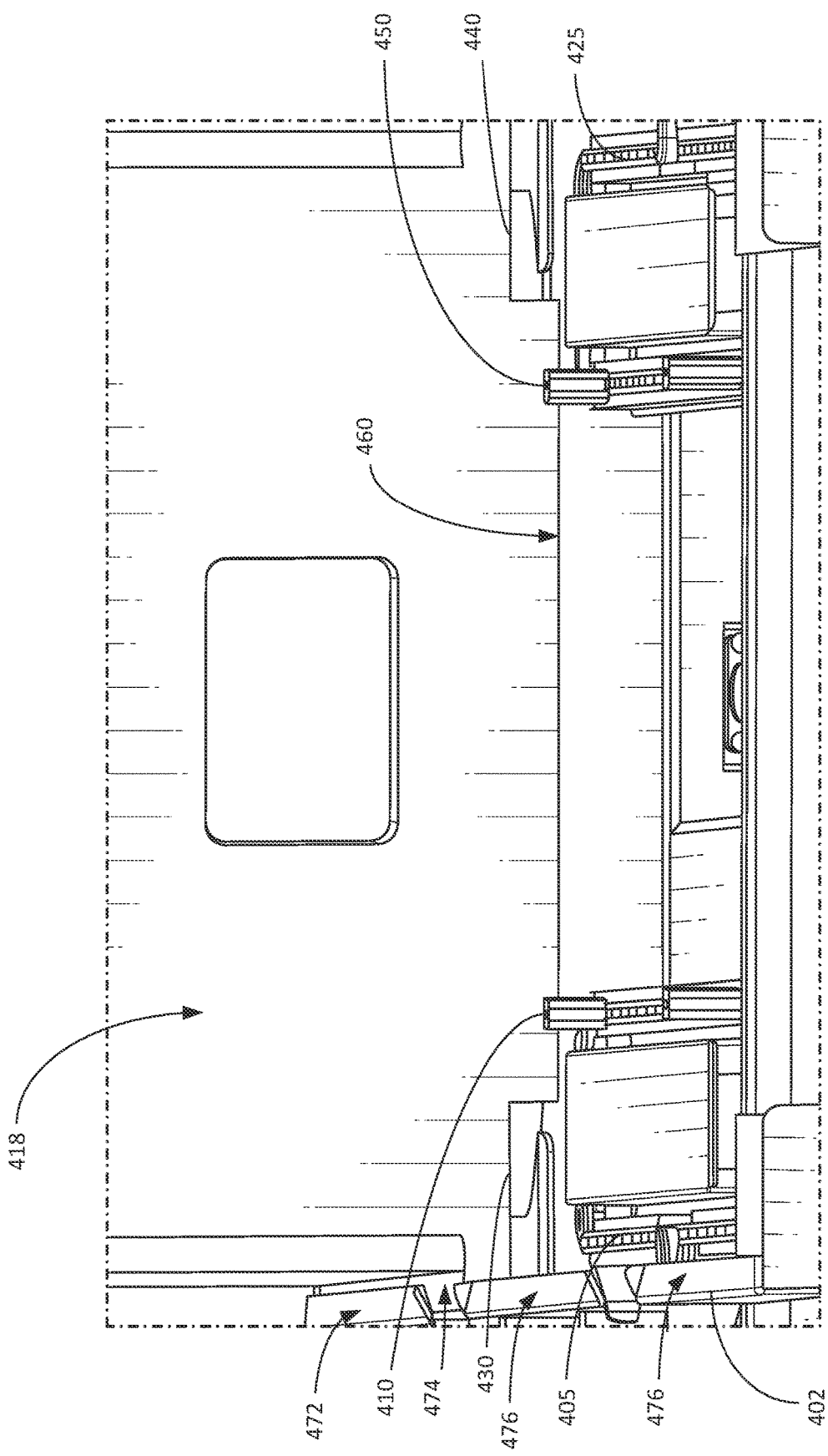
FIG. 4 is a perspective illustration of a protrusion and a channel opening, in accordance with one or more example embodiments of the disclosure.

Referring now to FIG. 4, container tray 418 is illustrated with openings 430 and 450 for receiving protrusions 410 and 440, respectively. For example, actuator system 405 of shuttle 402 may cause protrusion 410 to move into opening 430. Similarly, actuator system 425 may cause protrusion 450 to move into opening 440. Protrusion 410 may be sized with a height that is lower than a top of opening 430 such that protrusion 410 may enter opening 430. Similarly, protrusion 450 may be sized with a height that is lower than a top of opening 440 such that protrusion 450 may enter opening 440. Alternatively, or additionally, protrusion 410 and/or protrusion 450 may be retractable, rotatable, and/or otherwise actuated such that protrusion 410 and/or protrusion 450 may transition from a non-actuated position in which protrusion 410 and/or protrusion 450 may have a height lower than bottom height 460 of container tray 418 to a actuated position in which protrusion 410 and/or protrusion 450 may have a height higher than bottom height 460 of container tray 418 but lower than a top of opening 430 and 440. Actuator systems 405 and/or 425 may be the same or similar to actuator systems 305 and/or 325 of FIG. 3A, respectively.

Container tray 418 may include lip 474, which may protrude from a side of container tray 418 near a side, edge, and/or bottom portion of container tray 418. The multi-level storage structure supporting container tray 418 may include guide 472 which may be a guide, rail, channel, or the like in which lip 474 may be received and/or constrained in one or more directions. For example, when lip 474 is within guide 472, container tray 418 may be constrained such that it may only move toward and away from shuttle 402. Shuttle 402 may include guides 476 which may be similar to guides 472 and receive and restrain movement of lip 474. Guides 486 may be a guide, rail, channel, or the like in which lip 474 may be received and/or constrained in one or more directions. In this manner, container tray 418 may be prevented from moving in undesirable directions (e.g., upward with respect to shuttle 402) and/or may be prevented from tilting.

Figure 5:
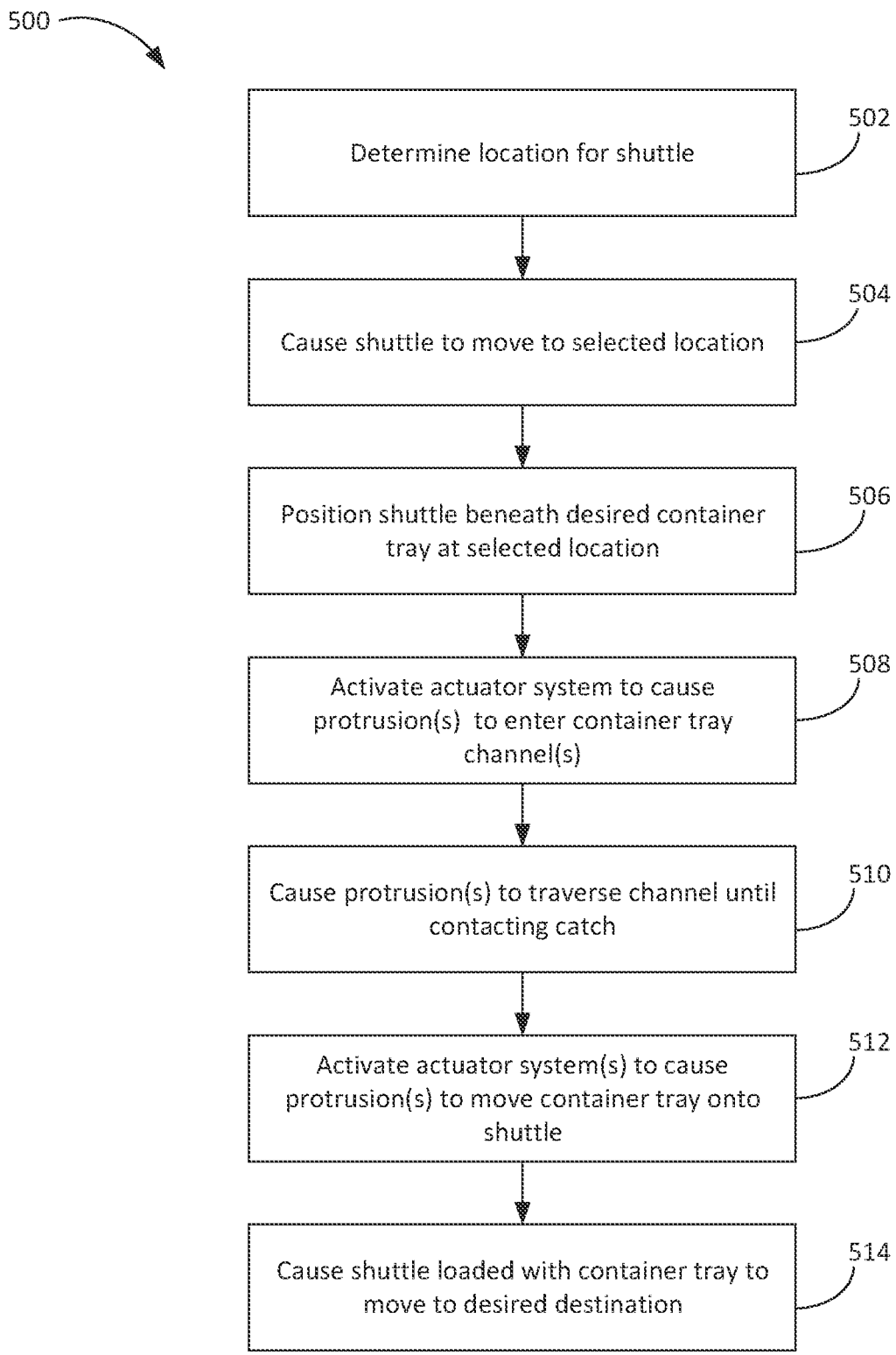
FIG. 5 is an exemplary process flow for controlling a shuttle including an actuator system, in accordance with one or more example embodiments of the disclosure.

Referring now to FIG. 5, example process flow 500 of a multi-level storage system (e.g., multi-level storage system 100 of FIG. 1) is depicted for moving a shuttle (e.g., shuttle 102 of FIG. 1) on a multi-level storage structure (e.g., multi-level storage structure 104 of FIG. 1). To initiate process flow 500, at block 502 computer-executable instructions stored on a memory of a device, such as a controller, may be executed to determine a location to move a shuttle (e.g., a location on the multi-level storage structure of a specific container).

At block 504 computer-executable instructions stored on a memory of a device, such as a controller, may be executed to cause the shuttle to move to the selected location. At block 506, computer-executable instructions stored on a memory of a device, such as a controller, may be executed to position the shuttle beneath the desired container tray at the selected location. At block 508, computer-executable instructions stored on a memory of a device, such as a controller, may be executed to activate one or more actuator systems to cause one more protrusions to enter a channel of the container tray (e.g., via openings in the container tray).

At block 510, computer-executable instructions stored on a memory of a device, such as a controller, may be executed to cause protrusions to traverse the channel until contacting a catch. At block 512, computer-executable instructions stored on a memory of a device, such as a controller, may be executed to activate one or more actuator systems to cause one or more protrusions to move the container tray onto the shuttle. At block 514, computer-executable instructions stored on a memory of a device, such as a controller, may be executed to cause the shuttle loaded with the container tray to move to a desired destination (e.g., to a shipping area).

Illustrative Device Architecture

Figure 6:
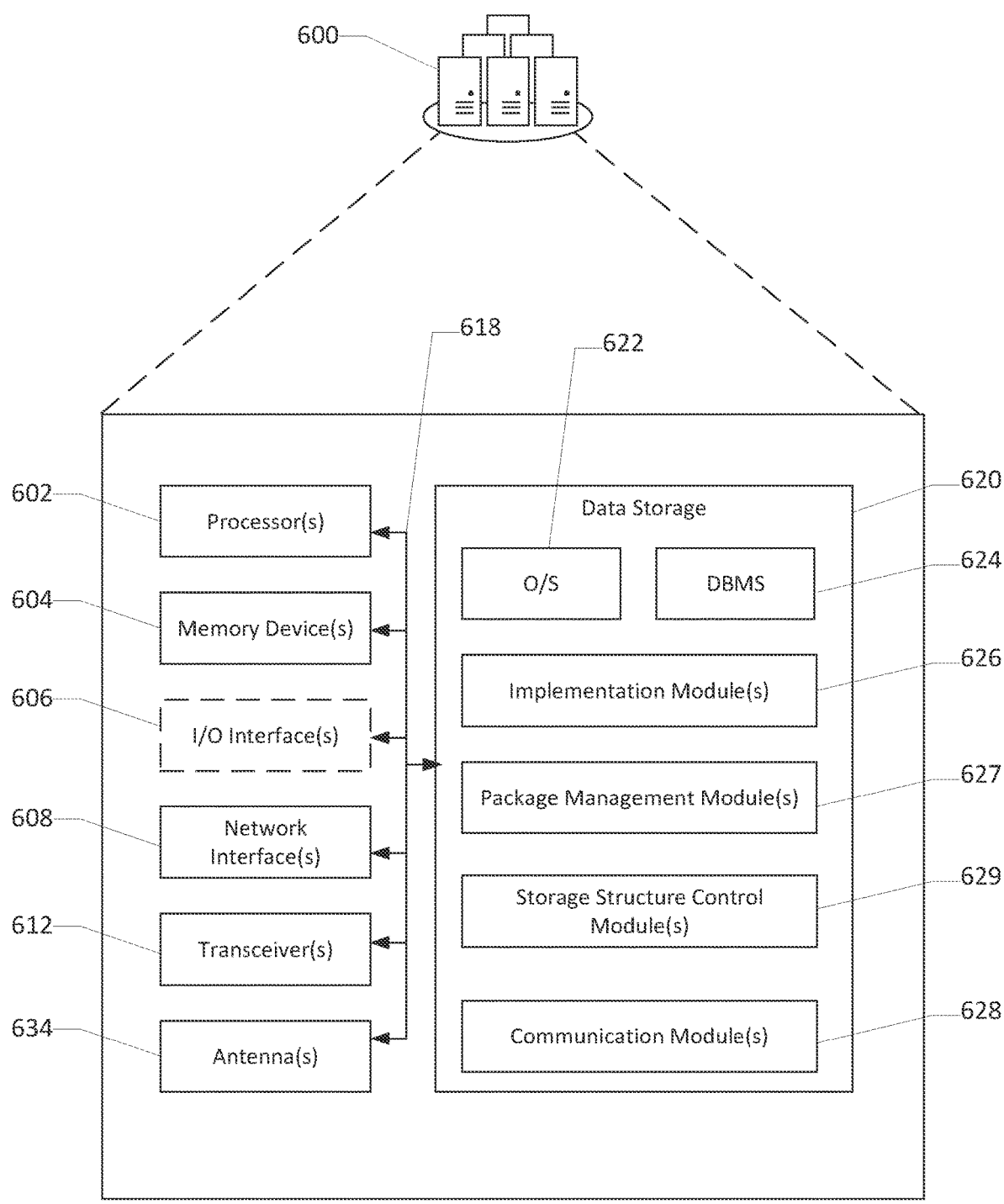
FIG. 6 is a schematic block diagram of a controller in accordance with one or more exemplary embodiments of the disclosure.

FIG. 6 is a schematic block diagram of an illustrative controller 600 of the shuttle lift system in accordance with one or more example embodiments of the disclosure. The controller 600 may include any suitable computing device capable of receiving and/or sending data, and may optionally be coupled to devices including, servers, controllers, user devices, delivery vehicles, fulfillment center devices, conveyor devices, and any other devices such as a smartphone, tablet, e-reader, mobile device, wearable device, a connected device, a desktop computer, a laptop computer, one or more servers, or the like. The controller 600 may correspond to controller 106 of FIG. 1 and/or any other controller of FIGS. 1-5. Alternatively, a server, such as server 108 of FIG. 1, may have the same components and functionality.

The controller 600 may be configured to communicate (e.g., one or more networks) with a server (e.g., server 108 of FIG. 1). Controller 600 may additionally communicate via one or more networks with one or more servers, controllers, user devices, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the controller 600 may include one or more processors (processor(s)) 602, one or more memory devices 604 (generically referred to herein as memory 604), one or more input/output (I/O) interface(s) 606, one or more network interface(s) 608, one or more transceivers 612, one or more antenna(s) 634, and data storage 620. The controller 600 may further include one or more buses 618 that functionally couple various components of the controller 600. The controller 600 may further include one or more antenna (e) 634 that may include, without limitation, a cellular antenna for transmitting or receiving signals to/from a cellular network infrastructure, an antenna for transmitting or receiving Wi-Fi® signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the controller 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the controller 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more optional database management systems (DBMS) 624; and one or more program module(s), applications, engines, computer-executable code, scripts, or the like such as, for example, one or more implementation module(s) 626, one or more package management module(s) 627, one or more communication module(s) 628, and/or one or more storage structure control module(s) 629. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the controller 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the controller 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation module(s) 626 may include computer-executable instructions, code, or the like that responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, determining user devices associated with a user account, sending signals to user devices, electronic devices, other computing devices, servers, datastores and the like, initiating commands locally or at remote devices, and the like.

The tower lift system module(s) 627 may include computer-executable instructions, code, or the like that responsive to execution by one or more of the processor(s) 602 may perform functions including, but not limited to, overseeing flow, storage, retrieval, and/or shipping of packages and may otherwise keep track of each package in on the multi-level storage structure and/or in a fulfillment center.

The communication module(s) 628 may include computer-executable instructions, code, or the like that responsive to execution by one or more of the processor(s) 602 may perform functions including, but not limited to, communicating with one or more devices, for example, via wired or wireless communication, communicating with controllers, multi-level storage structures, sensors, servers, user devices, conveyor devices, fulfillment center devices and delivery vehicles, communicating with servers (e.g., remote servers), communicating with remote datastores and/or databases, sending or receiving notifications or commands/directives, communicating with cache memory data, and the like.

The shuttle control module(s) 629 may include computer-executable instructions, code, or the like that responsive to execution by one or more of the processor(s) 602 may perform functions including, but not limited to controlling of the multi-level storage system including movement of shelves, cables, drive shafts and motors control and/or movement of the shuttle onto and off of the tower lift system and/or control the shuttle on the multi-level storage structure, which may include loading one or more package containers and/or packages onto the shuttle via an actuator system.

Referring now to other illustrative components depicted as being stored in the data storage 620, the O/S 622 may be loaded from the data storage 620 into the memory 604 and may provide an interface between other application software executing on the controller 600 and hardware resources of the controller 600. More specifically, the O/S 622 may include a set of computer-executable instructions for managing hardware resources of the controller 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The optional DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the controller 600 is a mobile computing device, the DBMS 624 may be any suitable light-weight DBMS optimized for performance on a mobile device.

Referring now to other illustrative components of the controller 600, the optional input/output (I/O) interface(s) 606 may facilitate the receipt of input information by the controller 600 from one or more I/O devices as well as the output of information from the controller 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; and so forth. Any of these components may be integrated into the controller 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna (e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The controller 600 may further include one or more network interface(s) 608 via which the controller 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna (e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna (e) 634 may be communicatively coupled to one or more transceivers 612 or radio components to which or from which signals may be transmitted or received.

As previously described, the antenna (e) 634 may include a Bluetooth antenna configured to transmit or receive signals in accordance with established standards and protocols, such as Bluetooth and/or BLE. Alternatively, or in addition to, antenna (e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna (e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 634 may be configured to transmit or receive radio frequency signals within any suitable frequency range forming part of the unlicensed portion of the radio spectrum (e.g., 900 MHz).

The antenna (e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna (e) 634—transmitting or receiving radio frequency (RF) signals in the bandwidth and/or channels corresponding to the communications protocols utilized by the controller 600 to communicate with other devices. The transceiver(s) 612 may include hardware, software, and/or firmware for modulating, transmitting, or receiving—potentially in cooperation with any of antenna (e) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the controller 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 620, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the controller 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the controller 600 may include alternate and/or additional hardware, software, or firmware components beyond those described or depicted without departing from the scope of the disclosure. More particularly, it should be appreciated that software, firmware, or hardware components depicted as forming part of the controller 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a structure having a shuttle rail and a container support for receiving multiple containers adjacent to the shuttle rail;
   a container tray having a first surface configured to receive a container and a second surface opposite the first surface having a channel with a first catch, a second catch, and a guide portion extending between the first catch and the second catch, a third surface between the first surface and the second surfacing having an opening extending into the channel, the container tray configured to be received by the container support;
   a shuttle configured to traverse the shuttle rail of the structure, the shuttle comprising:
      at least two wheels configured to guide the shuttle along the shuttle rail;
      a power transmission receiver configured to electrically interface with the shuttle rail;
      a first motor configured to receive power from the power transmission receiver;
      a first drive shaft extending from the first motor and configured to mechanically interface with the first motor;
      a first gear configured to mechanically interface with the first drive shaft and to rotate in response to rotation of the first drive shaft;
      a first tether configured to move with respect to the shuttle, the first tether configured to mechanically interface with the first gear and move in response to rotation of the first drive shaft;
      a first protrusion fixed to the tether and configured to move with the tether; and
      a second protrusion fixed to the tether, configured to move with the tether, and spaced a set distance from the first protrusion,
   wherein the first motor is configured to rotate the first drive shaft in a first direction to move the tether to cause the first protrusion to enter the opening of the container tray and engage the first catch to load the container tray onto the shuttle.

2. The system of claim 1, wherein the first motor is further configured to further rotate the first drive shaft in the first direction to move the tether to cause the second protrusion to enter the opening, traverse the guide portion, and engage the second catch.

3. The method of claim 2, wherein the first motor is further configured to rotate the first drive shaft in a second direction to move the tether to cause the second protrusion engaged with the second catch to unload the container tray off the shuttle.

4. The system of claim 3, wherein:
   the second surface of the container tray has a second channel having a third catch, a fourth catch, and a second guide portion extending between the third catch and the fourth catch,
   the third surface of the container tray has a second opening extending into the second channel, and
   the shuttle further comprises:
      a second gear configured to mechanically interface with the first drive shaft and to rotate in response to rotation of the first drive shaft;
      a second tether configured to move with respect to the shuttle, the second tether configured to mechanically interface with the second gear and move in response to rotation of the first drive shaft;
      a third protrusion fixed to the second tether and configured to move with the second tether to enter the second opening and engage the third catch,
      a fourth protrusion fixed to the tether and configured to move with the tether to engage the fourth catch.

5. A system comprising:
   a shuttle configured to traverse a rail of a container support structure, the container support structure configured to support a container tray having a first channel with a first catch on an underside of the container tray, the shuttle comprising:

a set of wheels configured to guide the shuttle along the rail;
a power transmission receiver configured to electrically interface with the rail to receive a power supply;
a first tether configured to move in response to the power supply; and
a first protrusion fixed to the first tether and configured to move with the first tether, the first protrusion further configured to transition from a first position outside of the first channel to a second position inside the first channel and adjacent to the first catch,
wherein the tether is configured to cause the first protrusion to move to engage the first catch to cause the container tray to load onto the shuttle.

6. The system of claim 5, wherein the shuttle is configured to move freely along the rail with respect to the container tray when the first protrusion is in the first position and is configured to interface with the container tray when the first protrusion is in the second position.

7. The system of claim 5, wherein the first channel comprises a second catch separated from the first catch by a guide portion, and wherein the shuttle further comprises a second protrusion fixed to the tether and spaced a set distance from the first protrusion, the second protrusion configured to traverse the guide portion and engage the second catch.

8. The system of claim 5, wherein the shuttle further comprises a motor configured to receive the power supply from the power transmission receiver, a drive shaft extending from the motor and configured to mechanically interface with the motor, and a first gear configured to mechanically interface with the drive shaft and the first tether and to rotate in response to rotation of the drive shaft.

9. The system of claim 5, wherein the container tray has a first surface configured to receive a container, a second surface opposite the first surface having the first channel with the first catch, and a third surface between the first surface and the second surfacing having an opening extending into the first channel.

10. The system of claim 5, wherein the container tray includes a second channel having a second catch on the underside of the container tray.

11. The system of claim 10, wherein the shuttle further comprises:
a second tether configured to move in response to rotation of the drive shaft; and
a second protrusion fixed to the second tether and configured to move with the second tether, the second protrusion configured to transition from a third position outside of the second channel to a fourth position inside the second channel and adjacent to the second catch,
wherein the second tether is configured to cause the second protrusion to engage the second catch.

12. The system of claim 5, where the shuttle is configured to receive a first container tray and a second container tray from the container support structure.

13. The system of claim 5, further comprising the container support structure, the container support structure having a first container support level, a second container support level, a first rail adjacent to the first container support level, a second rail adjacent to the second container support level, and a shuttle lift system connecting the first rail to the second rail, wherein at least one of the first container support level and the second container support level comprises at least one lip configured to restrain movement of the container tray to only one direction.

14. The system of claim 13, further comprising a controller in communication with the shuttle and configured to cause the shuttle to move to a first location on the second container support level to load a first container.

15. A method comprising:
determining, by a controller, instructions to retrieve a first container positioned on a first container tray from a first level of a multi-level storage structure, the first container tray having a first channel including a first catch on an underside of the first container tray;
causing a shuttle to move along a rail on the first level of the multi-level storage structure to a first location corresponding to the first container tray, the shuttle comprising a power transmission receiver adapted to electrically interface with the rail to receive a power supply, a first tether adapted to move in response to the power supply, and a first protrusion fixed to the first tether,
causing first shuttle at the first location to move the first tether in a first direction to transition the first protrusion from a first position outside of the first channel to a second position inside the first channel to engage the first catch; and
causing the shuttle to move the first tether in the first direction from the second position to a third position to cause the shuttle to load the first container tray onto the shuttle.

16. The method of claim 15, wherein the channel comprises a second catch separated from the first catch by a guide portion, and wherein the shuttle further comprises a second protrusion fixed to the first tether and spaced a set distance from the first protrusion.

17. The method of claim 16, further comprising causing the shuttle at the first location to move the first tether in the first direction to transition the second protrusion from a third position outside of the channel to a fourth position inside the channel to engage the second catch.

18. The method of claim 15, further comprising causing the shuttle to move the first tether in the first direction from the third position to a fourth position to cause the shuttle to load the first container tray off the shuttle, wherein the first container tray is loaded on a first side of the shuttle and unloaded on a second side of the shuttle, different than the first side of the shuttle.

19. The method of claim 15, wherein the shuttle is loaded with a second container tray before causing the shuttle to move along the rail to the first location, and further comprising causing the shuttle to unload the second container tray at the first location, after causing the shuttle to load the first container tray onto the shuttle.

20. The method of claim 15, wherein the first container tray includes a second channel including a second catch on the underside of the container tray and the shuttle includes a second tether adapted to move in response to rotation of the power supply and having a second protrusion fixed to the second tether, the method further comprising causing the shuttle to move the second tether in the first direction to transition the second protrusion from a third position outside of the second channel to a fourth position inside the second channel and adjacent to the second catch.

* * * * *